US008573302B2

(12) United States Patent
Robb et al.

(10) Patent No.: US 8,573,302 B2
(45) Date of Patent: Nov. 5, 2013

(54) SURFACTANTS AND FRICTION REDUCING POLYMERS FOR THE REDUCTION OF WATER BLOCKS AND GAS CONDENSATES AND ASSOCIATED METHODS

(75) Inventors: Ian D. Robb, Lawton, OK (US); Jason E. Bryant, Duncan, OK (US); Richard D. Rickman, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 468 days.

(21) Appl. No.: 12/688,542

(22) Filed: Jan. 15, 2010

(65) Prior Publication Data

US 2011/0174492 A1    Jul. 21, 2011

(51) Int. Cl.
*E21B 43/27*    (2006.01)

(52) U.S. Cl.
USPC ............... 166/308.2; 166/300; 166/305.1

(58) Field of Classification Search
USPC ............ 166/305.1, 308.1–308.3, 310, 300
See application file for complete search history.

(56) References Cited

U.S. PATENT DOCUMENTS

| | | | |
|---|---|---|---|
| 4,574,885 A | | 3/1986 | Horton |
| 5,663,123 A | * | 9/1997 | Goodhue et al. ............. 507/225 |
| 7,398,826 B2 | * | 7/2008 | Hoefer et al. ............. 166/280.1 |
| 7,398,829 B2 | | 7/2008 | Hutchins et al. |
| 7,779,915 B2 | * | 8/2010 | Hutchins et al. ........... 166/308.3 |
| 2002/0132741 A1 | | 9/2002 | Chang et al. |
| 2006/0166836 A1 | | 7/2006 | Pena et al. |
| 2007/0114035 A1 | | 5/2007 | Parris et al. |
| 2008/0026957 A1 | | 1/2008 | Gurmen et al. |
| 2008/0066909 A1 | | 3/2008 | Hutchins et al. |
| 2008/0280788 A1 | | 11/2008 | Parris et al. |
| 2011/0174485 A1 | * | 7/2011 | Robb et al. ................. 166/270.1 |
| 2011/0174492 A1 | | 7/2011 | Robb et al. |

OTHER PUBLICATIONS

International Preliminary Report on Patentability for PCT/GB2011/000051 dated Jul. 17, 2012.

* cited by examiner

*Primary Examiner* — Angela M DiTrani
*Assistant Examiner* — Catherine Loikith
(74) *Attorney, Agent, or Firm* — Robert A. Kent; McDermott Will & Emery LLP

(57) ABSTRACT

Improved treatment fluids and methods for use in subterranean operations including the treatment of low permeability shale formations. In one embodiment the methods comprise: providing a treatment fluid comprising an aqueous base fluid and a controlled wetting system that comprises: a water soluble polymer having a charge, a surfactant having an opposite charge, and a compatibilizer; and introducing the treatment fluid into a subterranean formation.

19 Claims, 2 Drawing Sheets

SURFACTANTS AND FRICTION REDUCING POLYMERS FOR THE REDUCTION OF WATER BLOCKS AND GAS CONDENSATES AND ASSOCIATED METHODS

BACKGROUND OF THE INVENTION

The present invention relates to fluids useful for subterranean operations, and more particularly, to treatment fluids comprising surfactants and water soluble polymers, and methods of use employing such treatment fluids to treat low permeability shale formations.

Aqueous treatment fluids may be used in a variety of subterranean treatments. Such treatments include, but are not limited to, stimulation operations and completion operations. As used herein, the term "treatment," or "treating," refers to any subterranean operation that uses a fluid in conjunction with a desired function and/or for a desired purpose. The term "treatment," or "treating," does not imply any particular action by the fluid.

An example of a subterranean treatment utilizing an aqueous treatment fluid is hydraulic fracturing. The fractures may be created by introducing a fracturing fluid into the formation at a rate sufficient to exert a sufficient pressure on the formation to create and extend fractures therein. Solid fracture proppant materials, such as sand, may be suspended in the fracturing fluid so that upon introducing the fracturing fluid into the formation and creating and extending fractures therein, the proppant material may be carried into the fractures and deposited therein. Such a treatment may prevent the fractures from closing due to subterranean forces when the introduction of the fracturing fluid has ceased.

During the placement of aqueous treatment fluids into a well bore, a considerable amount of energy may be lost due to friction between the treatment fluid in turbulent flow and the formation and/or tubular goods (e.g., pipes, coiled tubing, etc.) disposed within the well bore. As a result of these energy losses, additional horsepower may be necessary to achieve the desired treatment. To reduce these energy losses, water soluble polymers have been included in aqueous treatment fluids as friction reducing polymers. The term "friction reducing polymer," as used herein, refers to a polymer that reduces frictional losses due to friction between an aqueous fluid in turbulent flow and tubular goods (e.g. pipes, coiled tubing, etc.) and/or the formation.

Several conventional surfactants have also been used in treatment fluids in attempts to alleviate water and oil blocks within a formation. Surfactants, which contain a hydrophilic and a hydrophobic group, are mixed with a treatment fluid, inter alia, to lower the surface tension of the fluid in order to facilitate the cleanup and mitigate formation damage caused by either water blocks or gas condensates. In addition to lowering surface tension, surfactants also may change the formation wettability. This results from a decrease in the capillary pressure of the fluid in the flow channels in the subterranean formation, which may be accomplished by, among other things, changing the contact angle so that cleanup process can be very facile and hydrocarbon can flow with less resistance.

Cationic, anionic and zwitterionic surfactants may be used to enhance the production of hydrocarbons. While these surfactants have been used successfully, there may be disadvantages. In some instances, friction reducing polymers are incompatible with ionic surfactants used. The most common friction reducing polymers are anionic polymers based on acrylamide. It is believed that the ionic nature of such friction reducing polymers may cause these to interact with cationic or positively charged surfactants, and thereby form precipitates. The term "precipitate" as used herein, refers to a coagulated mass of particles in a liquid. The resulting precipitates may be undesirable because, among other things, the precipitates may facilitate the formation of agglomerates that may clog pumps, filters, surface equipment and possibly plug fractures. Similarly, precipitates may also reduce the fluid conductivity in the formation by adsorbing onto fracture faces within the formation impacts subsequent hydrocarbon production from the well bore. Moreover, the precipitated friction reducing polymer may lead to higher friction pressures resulting increased cost of fracturing. In addition, the precipitated surfactant may lower the capillary pressure of the fluid by not being able to properly adsorb to the rock surface, thus making the hydrocarbon recovery more difficult.

SUMMARY OF THE INVENTION

The present invention relates to fluids useful for subterranean operations, and more particularly, to treatment fluids comprising surfactants and water soluble polymers, and methods of use employing such treatment fluids to treat low permeability shale formations.

In one embodiment, the methods of the present invention comprise: providing a treatment fluid comprising an aqueous base fluid and a controlled wetting system that comprises: a water soluble polymer having a charge, a surfactant having an opposite charge, and a compatibilizer; and introducing the treatment fluid into a subterranean formation.

In another embodiment, the methods of the present invention comprise: providing a fracturing fluid comprising an aqueous base fluid and a controlled wetting system that comprises: a friction reducing polymer having a charge, a surfactant having an opposite charge, and a compatibilizer; and introducing the treatment fluid into at least a portion of a subterranean formation at a rate and pressure sufficient to create or enhance at least one or more fractures in the subterranean formation.

In yet another embodiment, the methods of the present invention comprise: providing a fracturing fluid that comprises an aqueous base fluid, and a controlled wetting system that comprises: a friction reducing polymer having a charge, a surfactant having an opposite charge, and a compatibilizer; and introducing the treatment fluid into at least a portion of a low permeability subterranean formation at a rate and pressure sufficient to create or enhance at least one or more fractures therein.

Other features and advantages of the present invention will be readily apparent to those skilled in the art upon a reading of the description of preferred embodiments which follows.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
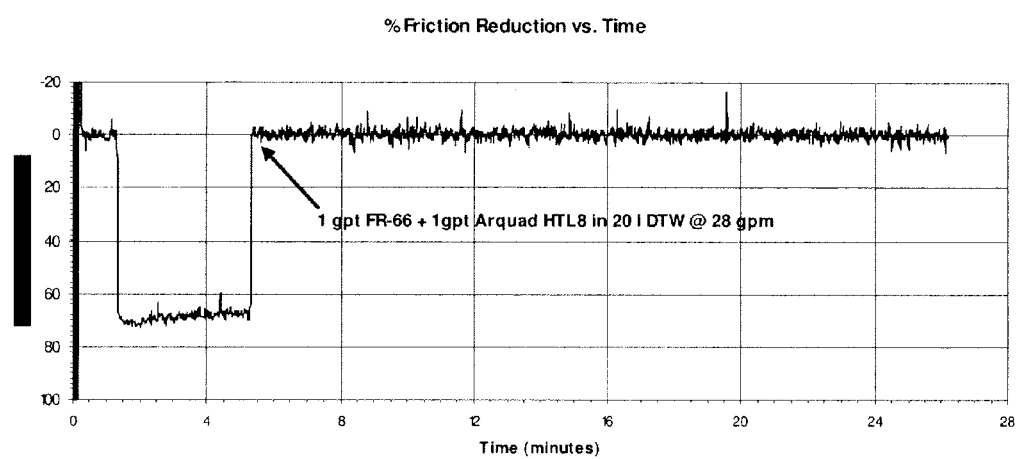
FIG. 1 shows the effect on friction reduction of adding surfactants to the treatment fluids of the present invention.

The present invention relates to fluids useful for subterranean operations, and more particularly, to treatment fluids comprising surfactants and water soluble polymers, and methods of use employing such treatment fluids to treat low permeability shale formations.

Of the many advantages of the compositions and related methods of the present invention (only some of which are alluded to herein), is that treatment fluids of the present invention may improve oil and/or gas production by reducing the occurrence of water blocks, oil blocks and/or gas condensates in the treated portion of the formation. Without being limited by theory, once introduced into the formation, the surfactants and water soluble polymers are thought to adsorb onto rock surfaces in the treated portion of the formation. Once adsorbed, it is believed that the surfactants may increase the contact angle between water and the surfaces of the rock in the formation. By way of example, the contact angle may be increased from less than 90° to an angle closer to 90°. This may directly (or indirectly) lead to reduced capillary pressure in the fluid in the pores of the formation. Reduced capillary pressure may lead to increased water-flow rates. As will be appreciated, improved water-flow rates should allow a reduction in existing water blocks, as well as a reduction in the formation of water blocks. Moreover, it is also believed that treatment fluids of the present invention may be used in a remedial method for clean up of the existing water blocks, oil blocks, or gas condensate blocks. Another advantage of the present invention is the ability to maintain a controlled wetting system wherein ionic surfactants and water soluble polymers remain compatible and do not precipitate from solution. The ability to maintain the components of the controlled wetting system in solution with the friction reducing agents allows for better production of hydrocarbons.

In accordance with embodiments of the present invention, the treatment fluids generally comprise an aqueous base fluid and a controlled wetting system. The controlled wetting system of the present invention comprises a water soluble polymer having a charge, a surfactant having an opposite charge, and a compatibilizer.

By way of example, the aqueous base fluid of embodiments of the treatment fluids of the present invention may be any fluid comprising an aqueous component. Suitable aqueous components include, but not limited to, fresh water, salt water, brine (e.g., saturated or unsaturated saltwater), seawater, pond water and any combination thereof. Generally, the aqueous component may be from any source. Suitable aqueous base fluids may include foams. One of ordinary skill in the art, with the benefit of the present disclosure, will recognize suitable aqueous base fluids for use in the treatment fluids and methods of the present invention. some embodiments, the aqueous base fluid may be present in a treatment fluid of the present invention in an amount in the range of about 75% to about 99.9% of the treatment fluid.

The surfactants of the present invention may be any suitable surfactants that may perform the desired function. In certain embodiments, the surfactants of the present invention may be cationic, anionic, nonionic or zwitterionic. Examples of cationic surfactants include, but are not limited to, alkyl quaternaryammonium compounds, alkyl trialkylammonium bromides, dialkyldiethylammonium chlorides, alkyl imidazolines, polyethoxylated alkylammonium chlorides, alkyldimethylbenzylammonium chlorides, alkylpyridinium chlorides, alkyl diammonium pentamethyl chlorides, and any derivative and combinations thereof. The term "derivative" includes any compound that is made from one of the listed compounds, for example, by replacing one atom in the listed compound with another atom or group of atoms, rearranging two or more atoms in the listed compound, ionizing one of the listed compounds, or creating a salt of one of the listed compounds.

Examples of anionic surfactants include, but are not limited to, alkyl sulfates, alkyl sulfonates, alkyl aryl sulfonates, alkyl aryl sulfates, olefin sulfonates, fatty acid salts, fatty acid ester sulfonates, alkyl ether sulfates, alkyl ether phosphates, alkyl phosphate esters, alkylalcohol ethoxylate phosphate esters, alkyl phenol ethoxylate phosphates, phenol ethoxylate phosphates, alkyl ether carboxylates dialkyl sulfosuccinates, perfluoroalkanoic acids, sodium alkyl sarcosinates, and any derivitives and combinations thereof.

Examples of zwitterionic surfactants include, but are not limited to, alkylamidopropyl betaines, alkyliminodipropionate disodiums, alkylamphodiacetate disodiums, alkylampho hydroxypropyl sulfonate sodiums, alkylamidopropylhydroxysultaines, lecithins, and any derivatives and combinations thereof.

Examples of nonionic surfactants include, but are not limited to, alkyl ethoxylates, alkyl phenol ethoxylates, sorbitan fatty acid esters, ethoxylated sorbitan fatty acid esters, alkyl polyglucosides, ethoxylated alkylamines, polyamineethoxylated diamines, alkylpropoxylated amines, fatty alcohols, alkylamide monoethanolamines, alkylamide diethanolamines, alkyldialkylamine oxides, alkylamides, ethoxylated amides alkoxylated alkyl phenols, alkoxylated alcohols, polyols, polyol esters, and any derivatives and combinations thereof.

Sufficient concentrations of suitable ionic surfactants may be present in the treatment fluids of the present invention to provide a desired effect. The amount of the cationic or anionic to include in the treatment fluid depends on a number of factors including, but not limited to, the composition and the porosity of the subterranean formation. In some embodiments, the first and second surfactants may be present in a treatment fluid of the present invention in an amount in the range of about 0.001% to about 3% by volume of the treatment fluid. In some embodiments, the first and second surfactant may be present in an amount in the range of about 0.01% to about 0.5% by volume of the treatment fluid. In certain embodiments of the present invention, the first, the second, or both surfactants may be provided in a concentrated solution prior to their combination with the other components necessary to form a treatment fluid of the present invention.

The treatment fluids of the present invention may comprise a water soluble polymer that reduces energy losses within the treatment fluids. In certain embodiments, the water soluble polymers may act as friction reducing polymers. For example, friction reducing polymers may reduce energy losses upon introduction of the aqueous treatment fluid into a well bore due to friction between the aqueous treatment fluid in turbulent flow and the formation or in the well bore. Any friction reducing polymer suitable for use in subterranean applications may be suitable for use in the present invention. In an embodiment, the aqueous treatment fluids of the present invention may comprise a friction reducing polymer that comprises acrylamide and an ionic comonomer. In one embodiment, the friction reducing polymer may comprise acrylamide and an acrylic acid. The friction reducing polymer included in the treatment fluids of the present invention may also comprise any suitable polymer including polysaccharides that may be capable of being crosslinked, including, but not limited to, diutan gums, xanthan gums, and other polysaccharides including galactomannans, cellulose derivatives, derivatives thereof, and any combination thereof. Other suitable gums include, but are not limited to, hydroxyethylguar, hydroxypropylguar, carboxymethylguar, carboxymethylhydroxyethylguar and carboxymethylhydroxypropylguar. Examples of suitable cellulose derivatives include hydroxyethyl cellulose, carboxyethylcellulose, carboxymethylcellulose, and carboxymethylhydroxyethylcellulose; derivatives thereof, and combinations thereof. The crosslinkable polymers included in the treatment fluids of the present invention may be naturally-occurring, synthetic, or a combination thereof.

Generally, a friction reducing polymer of the present invention may be included in any aqueous treatment fluid used in subterranean treatments to reduce friction. Such subterranean treatments include, but are not limited to, stimulation treatments (e.g., fracturing treatments, acidizing treatments, fracture acidizing treatments) and remedial operations. The friction reducing polymers of the present invention may have either an anionic or cationic nature. Those of ordinary skill in the art, with the benefit of this disclosure, will be able to recognize a suitable subterranean treatment where friction reduction may be desired. While the friction reducers of the present invention may be suitable for use in a variety of aqueous treatment fluids, they may be particularly useful in treatment fluids wherein a friction reducing polymers' reduced sensitivity to salt is desired.

The friction reducing polymers of the present invention comprise acrylamide and an ionic monomer such as acrylic acid, methacrylic acid, AMPS, or DMEAMA. Generally, the ionic monomer present in the friction reducing copolymers of the present invention may be any monomer that maximizes friction reduction while minimizing flocculation and salt intolerance. In determining a suitable ionic monomer for use in the present invention, a variety of techniques may be used including, but not limited to, determining the radius of gyration for a particular friction reducing copolymer in the presence of interfering salts. Generally, including an ionic monomer that will give the copolymer a larger radius of gyration is desirable. It is believed that friction reducing agents possess large radii of gyration, in addition to generally having a molecular weight greater than 1,500,000 atomic mass units ("amu"). The ionic comonomer included in the friction reducing agents of the present invention are believed to increase radii of gyration through electrostatic repulsion, relative to those polymers composed entirely of acrylamide. Those of ordinary skill in the art, with the benefit of this disclosure, will be able to select an appropriate ionic comonomer to include in the friction reducing copolymers of the present invention based on a variety of factors, including the desired level of friction reduction and flocculation properties.

The amount of acrylamide and ionic comonomer to include in the friction reducing copolymers of the present invention may be determined based on a number of factors, including the desired friction reduction, flocculation properties, etc. Generally, the acrylamide may be present in the friction reducing copolymers of the present invention in an amount in the range of from about 60% to about 95% by weight and an ionic comonomer in an amount in the range of from about 5% to about 40% by weight.

The friction reducing polymers of the present invention should have a molecular weight sufficient to provide a desired level of friction reduction. Generally, friction reducing copolymers having higher molecular weights may be needed to provide a desirable level of friction reduction. For example, in some embodiments, the weight average molecular weight of the friction reducing copolymers may be in the range of from about 1,500,000 to about 20,000,000, as determined using intrinsic viscosity, light scattering or gel permeation chromatography. Those of ordinary skill in the art will recognize that friction reducing copolymers having molecular weights outside the listed range may still provide some degree of friction reduction in an aqueous treatment fluid.

The water soluble polymers of the present invention should be included in the aqueous treatment fluids of the present invention in an amount sufficient to provide the desired reduction of friction. In some embodiments, a friction reducing polymer of the present invention may be present in an amount in the range of from about 0.01% to about 3% by weight of the treatment fluid. In some embodiments, a water soluble polymer of the present invention may be present in an amount in the range of from about 0.05% to about 0.3% by weight of the treatment fluid.

The friction reducing polymers suitable for use in the present invention may be delivered in accordance with any of a variety of methods such as a water-in-oil emulsion or a water-continuous dispersion. In one embodiment, a suitable friction reducing polymer may be added in powder form. Those of ordinary skill in the art, with the benefit of this disclosure, will recognize an appropriate method to synthesize and provide a suitable friction reducing polymer.

A compatibilizer may be included to the treatment fluids of the present invention to prevent an undesirable interaction between the components of the controlled wetting system that leads to their precipitation out of the treatment fluids and their inability to deposit effectively on the formation surface. Suitable compatibilizers for use in the present invention include any type of compatibilizer that is capable of performing this function. In certain embodiments, the compatibilizer may be a nonionic and/or zwitterionic surfactant. Examples of suitable nonionic surfactants include, but are not limited to, alkyl ethoxylates, alkyl phenol ethoxylates, sorbitan fatty acid esters, ethoxylated sorbitan fatty acid esters, alkyl polyglucosides, ethoxylated alkylamines, polyamine-ethoxylated diamines, alkylpropoxylated amines, fatty alcohols, alkylamide monoethanolamines, alkylamide diethanolamines, alkyldialkylamine oxides, alkylamides, ethoxylated amides alkoxylated alkyl phenols, alkoxylated alcohols, polyols, polyol esters, and any derivatives and combinations thereof. In an embodiment, the compatibilizer may be an amphoteric surfactant. Examples of suitable amphoteric surfactants include, but are not limited to, alkylamidopropyl betaines, alkyliminodipropionate disodiums, alkylamphodiacetate disodiums, alkylampho hydroxypropyl sulfonate sodiums, alkylamidopropylhydroxysultaines, lecithins, and any derivatives and combinations thereof.

Sufficient concentrations of compatibilizer may be present in the treatment fluids of the present invention to provide a desired effect. The amount of the nonionic surfactant to include in the treatment fluid depends on a number of factors including, but not limited to, the composition and the porosity of the subterranean formation. In some embodiments, the compatibilizer may be present in a treatment fluid of the present invention in an amount in the range of about 0.001% to about 3% by volume of the treatment fluid. In some embodiments, the first and second surfactant may be present in an amount in the range of about 0.01% to about 0.5% by volume of the treatment fluid. In certain embodiments of the present invention, the compatibilizer may be provided in a concentrated solution prior to their combination with the other components necessary to form a treatment fluid of the present invention. In certain embodiments of the present invention, the compatibilizer may be added in equal concentration as the surfactant.

Depending on the use of the treatment fluid, in some embodiments, other additives may optionally be included in the treatment fluids of the present invention. Examples of such additives may include, but are not limited to, scale inhibitors, corrosion inhibitors, biocides, relative permeability modifiers (RPMs), particulates, breakers, and any combination thereof. A person of ordinary skill in the art, with the benefit of this disclosure, will recognize when such optional additives should be included in a treatment fluid used in the present invention, as well as the appropriate amounts of those additives to include.

The treatment fluids of the present invention may comprise particulates, such as proppant particulates or gravel particulates. Such particulates may be included in the treatment fluids of the present invention, for example, when a gravel pack is to be formed in at least a portion of the well bore or a proppant pack is to be formed in one or more fractures in the subterranean formation. Particulates suitable for use in the present invention may comprise any material suitable for use in subterranean operations. Suitable materials for these particulates may include, but are not limited to, sand, bauxite, ceramic materials, glass materials, polymer materials, TEFLON® (polytetrafluoroethylene) materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable for practice of the present invention. In particular embodiments, preferred mean particulate size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the present invention. In certain embodiments, the particulates included in the treatment fluids of the present invention may be coated with any suitable resin or tackifying agent known to those of ordinary skill in the art. In certain embodiments, the particulates may be present in the treatment fluids of the present invention in an amount in the range of from about 0.5 pounds per gallon ("ppg") to about 30 ppg by volume of the treatment fluid.

A biocide may be included to the treatment fluids of the present invention to reduce bioburden of the fluid so as to avoid introducing an undesirable level of bacteria into the subterranean formation. Suitable examples of biocides may include both oxidizing biocides and nonoxidizing biocides. Examples of oxidizing biocides include, but are not limited to, sodium hypochlorite, hypochlorous acid, chlorine, bromine, chlorine dioxide, and hydrogen peroxide. Examples of nonoxidizing biocides include, but are not limited to, aldehydes, quaternary amines, isothiazolines, carbamates, phosphonium quaternary compounds, and halogenated compounds. Factors that determine what biocide will be used in a particular application may include, but are not limited to, cost, performance, compatibility with other components of the treatment fluid, kill time, and environmental compatibility. One skilled in the art with the benefit of this disclosure will be able to choose a suitable biocide for a particular application.

An embodiment of a method of the present invention comprises introducing a treatment fluid into a subterranean formation, wherein the treatment fluid comprises an aqueous base fluid and a controlled wetting system comprising a surfactant having a charge, a water soluble polymer having an opposite charge, and a compatibilizer. The treatment fluids and methods of the present invention may be useful in other operations performed in subterranean formations. Such operations include, but are not limited to, a drilling operation, a drill-in operation, a fracturing operation, a well bore cleanup operation, a viscous sweep, a fines control operation, a gravel packing operation, a frac pack operation, an acidizing operation, a stimulation operation, and any combination thereof. For example, it may be desirable to include the ionic surfactant and water soluble polymers in a fluid used in fracturing, or acidizing to improve wettablility of the formation and reduce water blocks and/or gas condensates that may invade the production zone. One of ordinary skill in the art, with the benefit of the present disclosure, will recognize suitable operations in which the treatment fluids of the present invention may be used.

In certain embodiments, the treatment fluids of the present invention may be used in fracturing operations in a subterranean formation. In these embodiments, a treatment fluid of the present invention may be pumped into a well bore that penetrates a subterranean formation at a sufficient hydraulic pressure to create or enhance one or more cracks, or "fractures," in the subterranean formation. "Enhancing" one or more fractures in a subterranean formation, as that term is used herein, is defined to include the extension or enlargement of one or more natural or previously created fractures in the subterranean formation. The treatment fluids of the present invention used in these embodiments optionally may comprise particulates, often referred to as "proppant particulates," that may be deposited in the fractures. The proppant particulates may function, inter alia, to prevent one or more of the fractures from fully closing upon the release of hydraulic pressure, forming conductive channels through which fluids may flow to the well bore. Once at least one fracture is created and the proppant particulates are substantially in place, the viscosity of the treatment fluid of the present invention may be reduced (e.g., through the use of a gel breaker, or allowed to reduce naturally over time) to allow it to be recovered.

In certain embodiments, the treatment fluids of the present invention may be used in acidizing and/or acid fracturing operations. In these embodiments, a portion of the subterranean formation is contacted with a treatment fluid of the present invention comprising one or more organic acids (or salts thereof) and one or more inorganic acids (or salts thereof), which interact with subterranean formation to form "voids" (e.g., cracks, fractures, wormholes, etc.) in the formation. After acidization is completed, the treatment fluid of the present invention (or some portion thereof) may be recovered to the surface. The remaining voids in the subterranean formation may, inter alia, enhance the formation's permeability, and/or increase the rate at which fluids subsequently may be produced from the formation. In certain embodiments, a treatment fluid of the present invention may be introduced into the subterranean formation at or above a pressure sufficient to create or enhance one or more fractures within the subterranean formation. In other embodiments, a treatment fluid of the present invention may be introduced into the subterranean formation below a pressure sufficient to create or enhance one or more fractures within the subterranean formation.

In one embodiment, the present invention provides methods that include a method comprising: providing a fracturing fluid comprising an aqueous base fluid, a friction reducing polymer having a charge, a surfactant having an opposite charge, and a compatibilizer; and introducing the fracturing fluid into at least a portion of a subterranean formation at a rate and pressure sufficient to create or enhance at least one or more fractures in the subterranean formation.

In one embodiment, the present invention provides methods that include a method comprising: providing a fracturing fluid comprising an aqueous base fluid, a friction reducing polymer having a charge, a surfactant having an opposite charge, and a compatibilizer; introducing the treatment fluid into at least a portion of a low permeability subterranean formation at a rate and pressure sufficient to create or enhance at least one or more fractures therein.

To facilitate a better understanding of the present invention, the following examples of the preferred embodiments are given. In no way should the following examples be read to limit, or define, the scope of the invention.

Examples

Interactions between Arquad HTL 8 (a cationic surfactant), FR-46 (a friction reducing agent), and Tween 80 (a compatibilizer) were tested. The results show that solutions of cationic surfactants may be made compatible with a friction reducing agent by adding a compatibilizer and salt. The results are shown in Table 1.

TABLE 1

Compatibility of cationic surfactants with friction reducing agents

| FR-46 (%) | Arquad HTL 8 (%) | Tween 80 (%) | NaCl (%) | Comments |
| --- | --- | --- | --- | --- |
| 0.1 | 0.5 | 1.0 | 0 | Turbid |
| 0.1 | 0.5 | 1.0 | 0.5 | Turbid |
| 0.1 | 0.5 | 1.0 | 1.0 | Clear |
| 0.1 | 0.6 | 0.8 | 0 | Turbid |
| 0.1 | 0.6 | 0.8 | 0.5 | Turbid |
| 0.1 | 0.6 | 0.8 | 1.0 | Clear |
| 0.1 | 0.4 | 1.2 | 0 | Turbid |
| 0.1 | 0.4 | 1.2 | 0.5 | Clear |

Friction reduction tests were performed using the above polymer solutions comprising friction reducing agents, surfactants, and compatibilizers. The apparatus for measuring friction reduction (FR) consisted of a tank (~16 l) from which a low shear progressive cavity pump (Moyno 2L6) circulated fluid around a pipe of about 10 meters total length. This positive displacement pump produced lower shear than the fluid experienced in the pipes. The diameter of the pipe was 1.25 centimeters. The pressure drop across a 2.4 meter length of pipe was measured by Honeywell pressure transducers. The polymer solutions were injected into the pipe from a syringe, located 15 centimeters from the inlet to the tank.

The FR experiments were run by initially pumping the aqueous base fluid at the chosen rate for about a minute to establish the pressure drop for the base solution and this was compared with the value for water. As some salt solutions are more viscous than water the initial FR appears as a slightly negative value. After 1.2 minutes the polymer solution was injected by pneumatic pressure into the pipe and the pressure difference across the 2.4 meter length of pipe recorded. The FR was calculated by equation 1:

$$\% \text{ FR} = 100 \times (\Delta P_s - \Delta P_p)/\Delta P_s \quad \text{(Equation 1)}$$

where $\Delta P_s$ is the pressure drop across the 2.4 m pipe length for the solvent and $\Delta P_p$ is that due to the polymer solution. The friction reduction experiments were conducted with the acrylamide/acrylic acid copolymer (FR-66 available from Halliburton Energy Services, Inc., Duncan, Okla.) as the friction reducer, Arquad HTL 8 as the cationic surfactant and Tween 80 as the nonionic surfactant compatibilizer.

In FIG. 1 the friction reduction obtained with the FR-66 (1 gallon/1,000 gallon solution) dissolved in 1% NaCl is shown. Initially 0% FR was obtained with just the 1% NaCl, i.e. prior to the introduction of the FR-66, followed by an increase to about 70% after ~1.5 minutes. This continued for about a further 4 minutes when the cationic surfactant (Arquad HTL8 at 1 gallon/1,000 gallon solution) was injected into the system, resulting in a drop in FR to 0% due to the precipitation of some of the FR-66 by the surfactant. The friction reduction effect was identical when the cationic surfactant and compatibilizer were added to the polymeric solution, indicating good compatibility between the components of the fluid.

Figure 2:
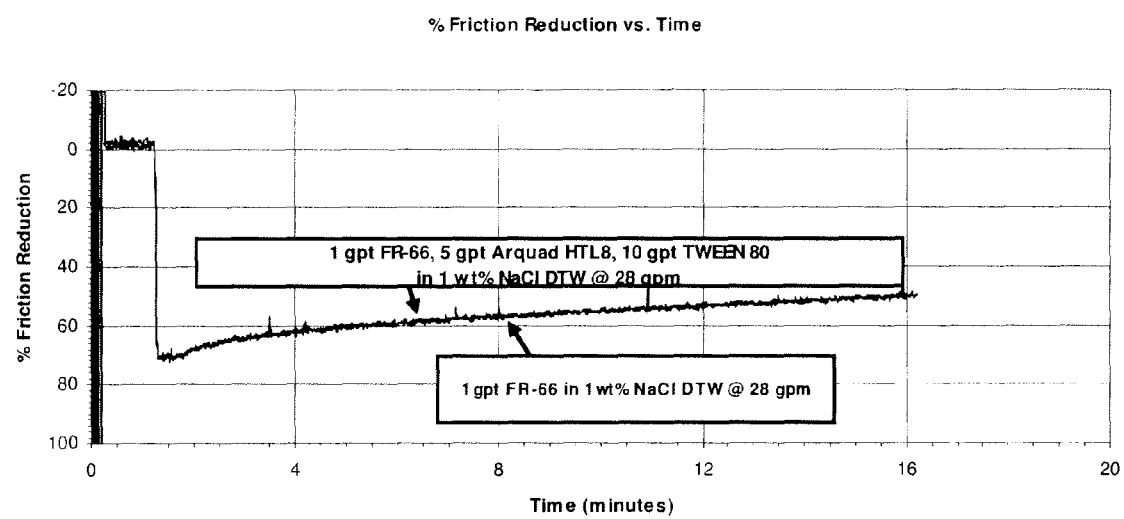
FIG. 2 shows the effect on friction reduction of adding a compatibilizer to the treatment fluids of the present invention.

In FIG. 2 the FR was measured for the FR-66 (at 1 gallon/1,000 gallons of solution) alone in 1% NaCl showing that the FR again reaches ~70% and gradually declines to about 50% after 16 minutes when pumped at the rate of 28 gallons/minute. A second experiment was run where a mixture of the cationic surfactant with a compatibilizing nonionic surfactant, Tween 80 was also present in the 1% NaCl solution. In this case the same level of FR was obtained as for the FR-66 (at 1 gallon per 1,000 gallons of solution) alone in 1% NaCl in contrast to the sharp drop in FR when the cationic surfactant was used without the compatibilizing nonionic surfactant. The friction reduction effect is destroyed when the cationic surfactant is added without a compatibilizer, indicating that a compatibilizer is necessary to maintain the components of the fluid compatible.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
   providing a treatment fluid comprising an aqueous base fluid and a controlled wetting system that comprises:
   a water soluble polymer having a charge, the water soluble polymer being selected from the group consisting of a copolymer of acrylamide and an ionic comonomer, a charged polysaccharide, and any combination thereof,
   wherein the charged polysaccharide is selected from the group consisting of a diutan gum, a xanthan gum, a galactomannan, a hydroxyethylguar, a hydroxypropylguar, a carboxymethylhydroxyethylguar, a hydroxyethyl cellulose, a carboxyethylcellulose, a carboxymethylcellulose, and any combination thereof;
   a surfactant having an opposite charge, and
   a compatibilizer; and
   introducing the treatment fluid into a subterranean formation.

2. The method of claim 1 wherein the water soluble polymer is present in an amount of about 0.01% to about 3% by weight of the treatment fluid.

3. The method of claim 1 wherein the aqueous base fluid comprises a fluid selected from the group consisting of fresh water, salt water, brine, seawater, and any combination thereof.

4. The method of claim 1 wherein the aqueous base fluid is present in an amount in the range of about 75% to about 99.9% by volume of the treatment fluid.

5. The method of claim 1 wherein the water soluble polymer is crosslinked.

6. The method of claim 1 wherein the surfactant is selected from the group consisting of a cationic surfactant, an anionic surfactant, and any combination thereof.

7. The method of claim 1 wherein the surfactant is present in an amount of about 0.001% to about 3% by volume of the treatment fluid.

8. The method of claim 1 wherein the compatibilizer is selected from the group consisting of an alkyl ethoxylate, an alkyl phenol ethoxylate, a sorbitan fatty acid ester, an ethoxylated sorbitan fatty acid ester, an alkyl polyglucoside, an ethoxylated alkylamine, a polyamine-ethoxylated diamine, an alkylpropoxylated amine, a fatty alcohol, an alkylamide monoethanolamine, an alkylamide diethanolamine, an alkyldialkylamine oxide, an alkylamide, an ethoxylated amides alkoxylated alkyl phenol, an alkoxylated alcohol, a polyol, a polyol ester, an alkylamidopropyl betaine, an alkyliminodipropionate disodium, an alkylamphodiacetate disodium, an alkylampho hydroxypropyl sulfonate sodium, an alkylamidopropylhydroxysultaine, a lecithin, and any combination thereof.

9. The method of claim 1 wherein the compatibilizer is present in an amount of about 0.001% to about 3% by volume of the treatment fluid.

10. The method of claim 1 wherein the treatment fluid further comprises an additional additive selected from the group consisting of a scale inhibitor, a corrosion inhibitor, a biocide, a relative permeability modifier (RPM), a particulate, a breaker, and any combination thereof.

11. A method comprising:
    providing a fracturing fluid comprising an aqueous base fluid and a controlled wetting system that comprises:
    a friction reducing polymer having a charge, the friction reducing polymer being selected from the group consisting of a copolymer of acrylamide and an ionic comonomer, a charged polysaccharide, and any combination thereof,
    wherein the charged polysaccharide is selected from the group consisting of a diutan gum, a xanthan gum, a galactomannan, a hydroxyethylguar, a hydroxypropylguar, a carboxymethylhydroxyethylguar, a hydroxyethyl cellulose, a carboxyethylcellulose, a carboxymethylcellulose, and any combination thereof;
    a surfactant having an opposite charge, and
    a compatibilizer; and
    introducing the fracturing fluid into at least a portion of a subterranean formation at a rate and pressure sufficient to create or enhance at least one or more fractures in the subterranean formation.

12. The method of claim 11 wherein the aqueous base fluid comprises a fluid selected from the group consisting of fresh water, salt water, brine, seawater, and any combination thereof.

13. The method of claim 11 wherein the aqueous base fluid is present in an amount in the range of about 75% to about 99.9% by volume of the fracturing fluid.

14. The method of claim 11 wherein the friction reducing polymer is present in an amount of about 0.01% to about 3% by weight of the treatment fluid.

15. The method of claim 11 wherein the surfactant is selected from the group consisting of a cationic surfactant, an anionic surfactant, and any combination thereof.

16. The method of claim 11 wherein the surfactant is present in an amount of about 0.001% to about 3% by weight of the treatment fluid.

17. The method of claim 11 wherein the compatibilizer is selected from the group consisting of an alkyl ethoxylate, an alkyl phenol ethoxylate, a sorbitan fatty acid ester, an ethoxylated sorbitan fatty acid ester, an alkyl polyglucoside, an ethoxylated alkylamine, a polyamine-ethoxylated diamine, an alkylpropoxylated amine, a fatty alcohol, an alkylamide monoethanolamine, an alkylamide diethanolamine, an alkyldialkylamine oxide, an alkylamide, an ethoxylated amides alkoxylated alkyl phenol, an alkoxylated alcohol, a polyol, a polyol ester, an alkylamidopropyl betaine, an alkyliminodipropionate disodium, an alkylamphodiacetate disodium, an alkylampho hydroxypropyl sulfonate sodium, an alkylamidopropylhydroxysultaine, a lecithin, and any combination thereof.

18. The method of claim 11 wherein the compatibilizer is present in an amount of about 0.001% to about 3% by weight of the treatment fluid.

19. A method comprising:
    providing a fracturing fluid that comprises an aqueous base fluid and a controlled wetting system that comprises:
    a friction reducing polymer comprising a copolymer of acrylamide and an ionic comonomer,
    a surfactant having a positive charge, and
    a compatibilizer comprising a zwitterionic surfactant; and
    introducing the fracturing fluid into at least a portion of a subterranean formation at a rate and pressure sufficient to create or enhance at least one or more fractures therein.

* * * * *